United States Patent
Hurley et al.

(10) Patent No.: US 6,472,015 B1
(45) Date of Patent: Oct. 29, 2002

(54) CROSS-LINKED POLYOLEFIN TAPE

(75) Inventors: Robert F. Hurley, Centerville, MA (US); John D. Bambara, Osterville, MA (US); Matthew L. Kozma, Osterville, MA (US)

(73) Assignee: Sentinal Products Corp., Hyannis, MA (US)

( * ) Notice: Subject to any disclaimer, the term of this patent is extended or adjusted under 35 U.S.C. 154(b) by 920 days.

(21) Appl. No.: 08/851,375

(22) Filed: May 5, 1997

Related U.S. Application Data

(62) Division of application No. 08/639,357, filed on Apr. 26, 1996, now abandoned.

(51) Int. Cl.[7] .................................................. B05D 5/10
(52) U.S. Cl. .................................. 427/207.1; 427/208.4
(58) Field of Search ........................... 427/207.1, 208.4

(56) References Cited

U.S. PATENT DOCUMENTS

| | | |
|---|---|---|
| 2,254,203 A | 9/1941 | Bender |
| 2,387,730 A | 10/1945 | Alderson |
| 2,450,436 A | 10/1948 | McIntire |
| 2,515,250 A | 7/1950 | McIntire |
| 2,740,157 A | 4/1956 | McCurdy et al. |
| 2,988,777 A | 6/1961 | Bieber et al. |
| 3,067,147 A | 12/1962 | Rubens et al. |
| 3,098,831 A | 7/1963 | Carr |
| 3,098,832 A | 7/1963 | Pooley et al. |
| 3,238,565 A | 3/1966 | Jacobs |
| 3,287,477 A | 11/1966 | Vesilind |
| 3,335,892 A | 8/1967 | Hildreth |
| 3,338,864 A | 8/1967 | Megall et al. |
| 3,346,686 A | 10/1967 | Collins |
| 3,379,802 A | 4/1968 | Radey et al. |
| 3,396,062 A | 8/1968 | White |
| 3,399,098 A | 8/1968 | Omoto et al. |
| 3,413,387 A | 11/1968 | Ohsol |
| 3,413,388 A | 11/1968 | Lux et al. |
| 3,431,163 A | 3/1969 | Gilbert |
| 3,431,164 A | 3/1969 | Gilbert |
| 3,539,473 A | 11/1970 | Simpson et al. |
| 3,565,243 A | 2/1971 | Freeman |
| 3,639,304 A | 2/1972 | Raley, Jr. |
| 3,644,230 A | 2/1972 | Cronin |
| 3,645,155 A | 2/1972 | Robinson |
| 3,645,992 A | 2/1972 | Elston |
| 3,646,155 A | 2/1972 | Scott |
| 3,651,183 A | 3/1972 | Hosoda et al. |
| 3,711,584 A | 1/1973 | Sagane et al. |
| 3,743,611 A | 7/1973 | Muroi et al. |
| 3,755,208 A | 8/1973 | Ehrenfreund |
| 3,804,684 A | 4/1974 | Tokushige et al. |
| 3,808,300 A | 4/1974 | Miyamoto et al. |
| 3,814,779 A | 6/1974 | Wiley |
| 3,886,100 A | 5/1975 | Yasuda et al. |
| 3,936,518 A | 2/1976 | Soda et al. |
| 3,938,661 A | 2/1976 | Carmody |
| 3,949,028 A | 4/1976 | Murakami et al. |
| 3,953,558 A | 4/1976 | Hatano et al. |
| 3,954,929 A | 5/1976 | Hoenke |
| 3,959,189 A | 5/1976 | Kitamori |
| 3,960,784 A | 6/1976 | Rubens |
| 3,965,054 A | 6/1976 | Nojiri et al. |
| 3,966,381 A | 6/1976 | Suh |
| 3,976,530 A | 8/1976 | Callan |
| 3,996,171 A | 12/1976 | Holland et al. |
| 4,048,275 A | 9/1977 | Usamoto et al. |
| 4,053,341 A | 10/1977 | Kleiner et al. |
| 4,058,583 A | 11/1977 | Glander et al. |
| 4,062,712 A | 12/1977 | Stark |
| 4,076,698 A | 2/1978 | Anderson et al. |
| 4,080,344 A | 3/1978 | Ikeda et al. |
| 4,089,818 A | 5/1978 | Slocumb |
| 4,102,720 A | 7/1978 | Kaneko et al. |
| 4,102,829 A | 7/1978 | Watanabe et al. |
| 4,110,269 A | 8/1978 | Ehrenfrueng |
| 4,117,195 A | 9/1978 | Swarbrick et al. |
| 4,126,598 A | 11/1978 | Reighter |
| 4,142,956 A | 3/1979 | Shikinami et al. |
| 4,146,598 A | 3/1979 | Coyne |
| 4,163,085 A | 7/1979 | Kuhnel et al. |
| 4,168,353 A | 9/1979 | Kitamori |
| 4,181,647 A | 1/1980 | Beach |
| 4,181,762 A | 1/1980 | Benedyk |
| 4,182,398 A | 1/1980 | Salyer et al. |

(List continued on next page.)

FOREIGN PATENT DOCUMENTS

| | | |
|---|---|---|
| CA | 451864 | 10/1948 |
| EP | 0 584 927 A2 | 3/1994 |
| EP | 702 032 | * 3/1996 |
| JP | 53-99241 | 8/1978 |
| JP | 60-158876 | 8/1985 |
| JP | 2-252782 | 10/1990 |
| JP | 7-188442 | 7/1995 |
| WO | WO 90/03414 | 4/1990 |
| WO | WO 92/14784 | 9/1992 |
| WO | WO 93/03093 | 2/1993 |

OTHER PUBLICATIONS

Ultsch & Fritz, "Crosslinking of LLDPE and VLDPE via graft–polymerized vinyltrimethoxysilane" *Rubber Processing and Applications,* 13:81–91, 1990.

Park, "Handbook of Polymeric Foams and Foam Technology, Polyolefin Foam," Oxford University Press, Chapter 9, pp. 156–242.

*Primary Examiner*—Terrel Morris
*Assistant Examiner*—Leanna Roché Jr.
(74) *Attorney, Agent, or Firm*—Cantor Colburn LLP

(57) ABSTRACT

The invention relates to polymer tapes that are blends including at least one silane-grafted single-site initiated polyolefin resin. The silane-grafted single-site initiated polyolefin resin generally is a copolymer of ethylene and a $C_3$–$C_{20}$ alpha-olefin that has a molecular weight distribution between about 1.5 and about 3.5. The polymer tapes include an adhesive on at least one face of the polymer. The polymer tapes can be foamed.

11 Claims, No Drawings

U.S. PATENT DOCUMENTS

| | | | |
|---|---|---|---|
| 4,203,815 A | 5/1980 | Noda et al. |
| 4,209,473 A | 6/1980 | Coyne |
| 4,211,590 A | 7/1980 | Steward et al. |
| 4,215,202 A | 7/1980 | Park |
| 4,225,650 A | 9/1980 | van Brederode et al. |
| 4,226,946 A | 10/1980 | Park et al. |
| 4,228,255 A | 10/1980 | Fujimoto et al. |
| 4,234,531 A | 11/1980 | Jocteur |
| 4,241,832 A | 12/1980 | Bliss |
| 4,247,651 A | 1/1981 | Ohno et al. |
| 4,275,023 A | 6/1981 | Shimizu et al. |
| 4,303,756 A | 12/1981 | Kajimura et al. |
| 4,303,757 A | 12/1981 | Kajimura et al. |
| 4,308,352 A | 12/1981 | Knaus |
| 4,333,898 A | 6/1982 | Schmidtchen |
| 4,337,321 A | 6/1982 | Allada |
| 4,347,329 A | 8/1982 | Park |
| 4,370,378 A | 1/1983 | Zabrocki et al. |
| 4,379,859 A | 4/1983 | Hirosawa et al. |
| 4,389,514 A | 6/1983 | Schmidle et al. |
| 4,399,098 A | 8/1983 | Akiyama et al. |
| 4,429,059 A | 1/1984 | Ozutsumi et al. |
| 4,433,029 A | 2/1984 | Senda et al. |
| 4,440,703 A | 4/1984 | Akiyama et al. |
| 4,443,393 A | 4/1984 | Akiyama et al. |
| 4,444,948 A | 4/1984 | Maillefer |
| 4,446,254 A | 5/1984 | Nakae et al. |
| 4,448,901 A | 5/1984 | Senda et al. |
| 4,464,425 A | 8/1984 | Voigt et al. |
| 4,473,665 A | 9/1984 | Martini-Vvedensky et al. |
| 4,504,534 A | 3/1985 | Adachi et al. |
| 4,510,031 A | 4/1985 | Matsumura et al. |
| 4,515,907 A | 5/1985 | McCullough et al. |
| 4,526,930 A | 7/1985 | Keogh |
| 4,542,164 A | 9/1985 | Nishioka et al. |
| 4,554,293 A | 11/1985 | Park |
| 4,581,383 A | 4/1986 | Park |
| 4,591,606 A | 5/1986 | Bergström |
| 4,592,468 A | 6/1986 | Wallace |
| 4,605,682 A | 8/1986 | Park |
| 4,633,361 A | 12/1986 | Ela et al. |
| 4,640,933 A | 2/1987 | Park |
| 4,652,588 A | 3/1987 | Park |
| 4,663,361 A | 5/1987 | Park |
| 4,666,946 A | 5/1987 | Fudge |
| 4,692,471 A | 9/1987 | Fudge |
| 4,694,025 A | 9/1987 | Park |
| 4,694,027 A | 9/1987 | Park |
| 4,702,868 A | 10/1987 | Pontiff et al. |
| 4,709,817 A | 12/1987 | Keady et al. |
| 4,714,716 A | 12/1987 | Park |
| 4,725,492 A | 2/1988 | Yazaki et al. |
| 4,739,547 A | 4/1988 | Tanaka et al. |
| 4,759,992 A | 7/1988 | Tomko et al. |
| 4,762,860 A | 8/1988 | Park |
| 4,767,814 A | 8/1988 | Bae et al. |
| 4,791,143 A | 12/1988 | Tanaka et al. |
| 4,791,147 A | 12/1988 | Tanaka et al. |
| 4,818,789 A | 4/1989 | Tomko et al. |
| 4,824,059 A | 4/1989 | Butler |
| 4,837,272 A | 6/1989 | Kelley |
| 4,850,913 A | 7/1989 | Szabad, Jr. |
| 4,868,044 A | 9/1989 | Tanaka et al. |
| 4,870,111 A | 9/1989 | Donuiff et al. |
| 4,873,042 A | 10/1989 | Topcik |
| 4,900,490 A | 2/1990 | Kozma |
| 4,906,421 A * | 3/1990 | Plamthottam |
| 4,908,166 A | 3/1990 | Salyer |
| 4,918,111 A | 4/1990 | Tanaka et al. |
| 4,937,284 A | 6/1990 | Bergstrom |
| 4,937,299 A | 6/1990 | Ewen et al. |
| 4,958,770 A | 9/1990 | Mitchell |
| 5,026,736 A | 6/1991 | Pontiff |
| 5,047,476 A | 9/1991 | Keogh |
| 5,053,446 A | 10/1991 | Salyer |
| 5,064,802 A | 11/1991 | Stevens et al. |
| 5,112,919 A | 5/1992 | Furrer et al. |
| 5,132,380 A | 7/1992 | Stevens et al. |
| 5,151,204 A | 9/1992 | Struglinski |
| 5,186,851 A | 2/1993 | Gutierrez et al. |
| 5,206,075 A | 4/1993 | Hodgson, Jr. |
| 5,210,150 A | 5/1993 | Prejean |
| 5,246,783 A | 9/1993 | Spenadel et al. |
| 5,268,115 A | 12/1993 | Gutierrez et al. |
| 5,272,236 A | 12/1993 | Lai et al. |
| 5,275,747 A | 1/1994 | Gutierrez et al. |
| 5,277,833 A | 1/1994 | Song et al. |
| 5,278,264 A | 1/1994 | Spaleck et al. |
| 5,278,272 A | 1/1994 | Lai et al. |
| 5,288,762 A | 2/1994 | Park et al. |
| 5,304,580 A | 4/1994 | Shibayama et al. |
| 5,322,728 A | 6/1994 | Davey et al. |
| 5,329,033 A | 7/1994 | Spaleck et al. |
| 5,340,840 A | 8/1994 | Park et al. |
| 5,345,002 A | 9/1994 | Song et al. |
| 5,350,817 A | 9/1994 | Winter et al. |
| 5,366,647 A | 11/1994 | Gutierrez et al. |
| 5,369,136 A | 11/1994 | Park et al. |
| 5,376,428 A | 12/1994 | Palazzoto et al. |
| 5,380,810 A | 1/1995 | Lai et al. |
| 5,382,698 A | 1/1995 | Song et al. |
| 5,385,972 A | 1/1995 | Yamamoto et al. |
| 5,387,620 A | 2/1995 | Park et al. |
| 5,391,629 A | 2/1995 | Turner et al. |
| 5,407,965 A | 4/1995 | Park et al. |
| 5,408,004 A | 4/1995 | Lai et al. |
| 5,461,110 A | 10/1995 | Arthurs et al. |
| 5,589,519 A | 12/1996 | Knaus |
| 5,604,033 A | 2/1997 | Arthurs et al. |
| 5,604,288 A | 2/1997 | Furukawa et al. |
| 5,612,510 A | 3/1997 | Hildreth |

* cited by examiner

CROSS-LINKED POLYOLEFIN TAPE

This is a divisional of application Ser. No. 08/639,357, filed Apr. 26, 1999, now abandoned.

BACKGROUND OF THE INVENTION

The invention relates to cross-linked polyolefin resins used to carry adhesives, as in a tape.

In general, tape is useful in joining applications and can be formed from polymer resins with good flexibility properties that are coated with adhesives. Tapes can include foamed or non-foamed polymer resins.

Foamed tape is a useful in applications where cushioning or gap-filling is important. Gap-filling is particularly important when the surface of the substrate is not uniform; the tape is capable of filling the surface irregularities and provide good contact of the adhesive surface with the substrate surface. Foamed tapes are useful for joining rough and irregular surfaces. It is important for the foamed tape to be flexible.

In tape applications, the surface of the polymer resin should be easily coated with a film of the adhesive. It is also important that the polymer resin adhere well to the adhesive in order to bond well to a substrate surface. Generally, desirable foams for making foamed tapes have low densities, decreasing the cost of material and weight while maintaining good foam properties. Foamed tapes can also have good insulating qualities.

In general, foamed tapes with these properties contain foams based on polyvinylchlorides (PVC), ethylene-propylene-diene monomer (EPDM) terpolymers, polyurethanes, or radiation cross-linked polyolefin materials. These materials generally contain other additives, such as plasticizers, to add to their flexibility. Polyolefins alone are typically limited in their application to adhesive tapes because of their limited flexibility. However, plasticizers can leach out of the materials over time which can make the materials less flexible and degrade the properties of the adhesives. In some circumstances, foams for use in tape applications should have good weatherability and flame resistance.

SUMMARY OF THE INVENTION

In general, the invention features polymer tapes that are blends of a polymer resin and a silane-grafted single-site initiated polyolefin resin. The silane-grafted single-site initiated polyolefin resin generally is a copolymer of ethylene and a $C_3$–$C_{20}$ alpha-olefin that has a molecular weight distribution between about 1.5 and about 3.5. The polymer tapes can be foamed to form foamed polymer tapes.

In one aspect, the invention features a polyolefin tape including a polyolefin sheet and an adhesive on at least one face of the sheet, the polyolefin including a silane-grafted single-site initiated polyolefin resin. It is preferred that the tape have a thickness of less than about 5/16 inch.

In other preferred embodiments, the polyolefin is foamed. It is preferred that the foam have a 25% compression resistance of less than 75 psi, more preferably less than 25 psi, and an elongation greater than 100 percent, more preferably greater than 250 percent.

In another aspect, the invention features a polymer tape including an adhesive and a silane-grafted polymer blend containing at least one single-site initiated polyolefin resin, the polymer tape having a tensile strength greater than 20 psi, a 25% compression resistance greater than 3 psi, more preferable between 3 and 150 psi, and an elongation greater than 100 percent, more preferably greater than 250 percent.

In preferred embodiments, the polymer blend is foamed. Preferably, the foam has a density between 1.5 and 50 pounds per cubic foot.

In preferred embodiments, the silane-grafted single-site initiated polyolefin resin is a copolymer of ethylene and a $C_3$–$C_{20}$ alpha-olefin having a density between about 0.85 and 0.91 g cm$^{-3}$ and a molecular weight distribution between about 1.5 and about 3.5. In other preferred embodiments, the polymer blend is foamed. It is preferred that a portion of the single-site initiated polyolefin resin be silane-grafted.

In preferred embodiments, a portion of the polyolefin, or polymer blend, is cross-linked. In other preferred embodiments, the polyolefin, or polymer blend, contains greater than about 20 percent silane-grafted single-site initiated polyolefin resin. It is preferred that the silane-grafted single-site polyolefin resin contain between about 0.1 and 3 percent silane.

In preferred embodiments, the tape further includes a polyethylene resin or an ethylene-vinyl acetate copolymer resin. It is preferred that the polyolefin tape contain between 20 and 50 percent ethylene-vinyl acetate copolymer resin. It is preferred that the ethylene-vinyl acetate copolymer resin contains between 5 and 25 percent vinyl acetate.

In other preferred embodiments, the silane includes a vinyl silane with 2 or 3 hydrolyzable groups. It is preferred that the adhesive include a rubber adhesive or an acrylate adhesive.

In yet another aspect, the invention features a method of making a polymer tape including the steps of: providing a cross-linkable polymer mixture including at least one single-site initiated polyolefin resin and a chemical foaming agent; extruding the polymer mixture; and applying an adhesive to the polymer mixture.

In preferred embodiments, the method further includes the step of silane-grafting the polymer mixture. In other preferred embodiments, the method further includes the step of silane-grafting the single-site initiated polyolefin resin.

It is preferred that the method further include the step of expanding the polymer mixture to form a foam. Preferably, the method also includes the step of cross-linking the polymer mixture. It is preferred that the step of cross-linking the polymer mixture include exposing the polymer mixture to moisture.

The term "short-chain branching," as used herein, means a branch of a polymer backbone of 6 carbon atoms or less which can be distinguished by $^{13}C$ NMR spectroscopic methods.

The term "copolymer," as used herein, means a polymer resulting from the polymerization of two or more monomeric species, including terpolymers (e.g., resulting from the polymerization of three monomeric species), sesquipolymers, and greater combinations of monomeric species. Copolymers are generally polymers of ethylene with $C_3$–$C_{20}$ alpha-olefins.

The densities, or specific gravities, of the polymer resins can be measured using ASTM D-792 methods.

The phrase "single-site initiated polyolefin resin," as used herein, means a polyolefin prepared from a single-site initiated polyolefin that has controlled molecular weights and molecular weight distributions. The polyolefin can be polyethylene, polypropylene, or a copolymer of ethylene and alpha-unsaturated olefin monomers. One class of a single-site initiators of particular interest are the metallocene initiators which are described, for example, in J. M. Canich, U.S. Pat. No. 5,026,798, in J. Ewen, et al., U.S. Pat. No. 4,937,299, in J. Stevens, et al., U.S. Pat. No. 5,064,802, and in J. Stevens, et al., U.S. Pat. No. 5,132,380, each of which are incorporated herein by reference. These initiators, particularly those based on group 4 transition metals, such as zirconium, titanium and hafnium, are extremely high activity ethylene polymerization initiators.

The single-site initiators are versatile. The polymerization conditions such as a initiator composition and reactor conditions can be modified to provide polyolefins with controlled molecular weights (e.g., in a range from 200 g mol$^{-1}$ to about 1 million or higher g mol$^{-1}$) and controlled molecular weight distributions (e.g., $M_w/M_n$ in a range from nearly 1 to greater than 8, where $M_w$ is the weight average molecular weight and $M_n$ is the number average molecular weight). Molecular weights and molecular weight distributions of polymers can be determined, for example, by gel permeation chromatography.

The polyolefins provided by these initiators are essentially linear, meaning that the polymers can contain uniformly distributed, highly controlled short chain branching sites. As used herein, the term "essentially linear" means that the polymers have less than about one long-chain branch for every ten thousand carbon atoms in the backbone of the polymer. As described above, one method of determining branching is $^{13}$C NMR spectroscopy.

When the single-site initiated polyolefins are copolymers, the composition distribution breadth index (CDBI) is generally greater than 50% and most preferably above 70%. The CDBI is a measurement of the uniformity of distribution of commoners among the individual polymer chains having a commoner content within 50% of the median bulk molar commoner content.

The "melt index" (MI) of a polymer resin is a measurement of processability under low shear rate conditions. The MI can be determined by ASTM D-1238 Condition E (190° C./2.16 kg). The MI of the polyolefins is generally between about 0.2 dg/min and about 100 dg/min, preferably, between about 1 dg/min and about 10 dg/min, and most preferably between about 2 dg/min and about 8 dg/min. The melt index of the polymer resins can be measured using ASTM D-1238.

The term "silane-grafted," as used herein, means attaching one or more silicon-containing monomer or polymer to the original polymer chains. The grafting is generally accomplished by forming active grafting sites on the original polymer chains in the presence of silicon-containing monomers, which can further polymerize as branches from the original polymer chains. Active grafting sites can be generated, for example, by free radicals or anions.

Foams for use in tape applications are generally closed-cell foams. The term "closed-cell," as used herein, means that the greater than approximately 70% of the form cell volumes have cell walls isolating them from the external atmosphere. One way to determine this is by measuring the amount of water that is absorbed into the foam when the foam is immersed in water.

The invention can have one or more of the following advantages. The polymer tapes can have improved flexibility, tensile strength, elongation, and compression set properties. The polymer tapes have good adhesion properties with traditional adhesives. The polymer tapes can be easily coated with these adhesives and can be foamed easily. Flexibility can be measured, for example, by compressing the foam by 25 percent and measuring the force it takes to compress the foam.

The polymer tapes, and foamed polymer tapes, based on silane-grafted single-site initiated polyolefin resins have good flexibility without the addition of other components such as plasticizers, for example. For example, plasticizers can leach out of tapes and foamed tapes over time, leading to degradation of the physical properties of the foam. Leaching plasticizers can also adversely affect the properties of the adhesive. The polymer tapes based on silane-grafted single-site initiated polyolefin resins do not require plasticizer components to enhance their physical properties. The polymer tapes do not contain sulfur or chlorine-containing materials.

The polymer tapes, and foamed polymer tapes, have good physical properties such as tensile strength, elongation, compression resistance (compression deflection), compression set, and tear resistance. These foam properties can be measured according to ASTM D-3575.

Other features and advantages of the invention will be apparent from the following detailed description thereof, and from the claims.

DETAILED DESCRIPTION

The polymer tape is a polyolefin resin or polyolefin-blend including at least one silane-grafted single-site initiated polyolefin resin. The polymer tape can be foamed. The single-site initiated polyolefin resins are derived from ethylene polymerized with at least one comonomer selected from the group consisting of at least one alpha-unsaturated $C_3$–$C_{20}$ olefin comonomers. Preferably, the alpha-unsaturated olefins contain between 3 and 16 carbon atoms, most preferably between 3 and 8 carbon atoms. Examples of such alpha-unsaturated olefin comonomers used as copolymers with ethylene include, but are not limited to, propylene, isobutylene, 1-butene, 1-hexene, 3-methyl-1-pentene, 4-methyl-1-pentene, 1-octene, 1-decene, 1-dodecene, styrene, halo- or alkyl-substituted styrene, tetrafluoroethylene, vinylcyclohexene, and vinylbenzocyclobutane.

The comonomer content of the polyolefin resins is generally between about 1 mole percent and about 32 mole percent, preferably between about 2 mole percent and about 26 mole percent, and most preferably between about 6 mole percent and about 25 mole percent.

The copolymer can include one or more $C_4$–$C_{20}$ polyene monomers. Preferably, the polyene is a straight-chain, branched chain or cyclic hydrocarbon diene, most preferably having between 6 and 15 carbon atoms. It is also preferred that the diene be non-conjugated. Examples of such dienes include, but are not limited to, 1,3-butadiene, 1,4-hexadiene, 1,6-octadiene, 5-methyl-1,4-hexadiene, 3,7-dimethyl-1,6-octadiene, 3,7-dimethyl-1,7-octadiene, 5-ethylidene-2-norbornene, and dicyclopentadiene. Especially preferred is 1,4-hexadiene.

The preferred single-site initiated polyolefin resins include either ethylene/alpha-unsaturated olefin copolymers or ethylene/alpha-unsaturated olefin/diene terpolymers.

Preferred single-site initiated polyolefin resins are described, for example, in S.-Y. Lai, et al., U.S. Pat. Nos. 5,272,236, 5,278,272, and 5,380,810, in L. Spenadel, et al., U.S. Pat. No. 5,246,783, in C. R. Davey, et al., U.S. Pat. No. 5,322,728, in W. J. Hodgson, Jr., U.S. Pat. No. 5,206,075, and in F. C. Stehling, et al., WO 90/03414, each of which is incorporated herein by reference. The resins contain varying amounts of short-chain and long-chain branching, which depend, in part, on the processing conditions.

Some single-site initiated polyolefin resins are available commercially from Exxon Chemical Company, Houston, Tex., under the tradename Exact™, and include Exact™ 3022, Exact™ 3024, Exact™ 3025, Exact™ 3027, Exact™ 3028, Exact™ 3031, Exact™ 3034, Exact™ 3035, Exact™ 3037, Exact™ 4003, Exact™ 4024, Exact™ 4041, Exact™ 4049, Exact™ 4050, Exact™ 4051, Exact™ 5008, and Exact™ 8002. Other single-site initiated resins are available commercially from Dow Plastics, Midland, Mich. (or DuPont/Dow), under the tradenames Engage™ or Affinity™, and include CL8001, CLS8002, EG8100, EG8150, PL1840, PL1845 (or DuPont/Dow 8445), EG8200, EG8180, GF1550, KC8852, FW1650, PL1880, HF1030, PT1409, CL8003, and D8130 (or XU583-00-01). Most preferably, the single-site initiated polyolefin resins are selected from the group consisting of Exact™ 3024, Exact™ 3031, PL1845, EG8200, and EG8180.

The polymer tape can include blends containing single-site initiated polyolefin resins and other polymer resins. The single-site initiated polyolefin resin can be silane-grafted before blending with other polymer resins. Alternatively, the blend itself can be silane-grafted. Examples of other polymer resins include low density polyethylene (LDPE), high density polyethylene (HDPE), linear low density polyethylene (LLDPE), ethylene-propylene rubber, ethylene-propylene-diene monomer terpolymer (EDPM), polystyrene, polyvinylchloride (PVC), polyamides, polyacrylates, celluloses, polyesters, polyhalocarbons, and copolymers of ethylene with propylene, isobutene, butene, hexene, octene, vinyl acetate, vinyl chloride, vinyl propionate, vinyl isobutyrate, vinyl alcohol, allyl alcohol, allyl acetate, allyl acetone, allyl benzene, allyl ether, ethyl acrylate, methyl acrylate, acrylic acid, or methacrylic acid. The polymer blends can also include rubber materials such as polychloroprene, polybutadiene, polyisoprene, polyisobutylene, nitrile-butadiene rubber, styrene-butadiene rubber, chlorinated polyethylene, chlorosulfonated polyethylene, epichlorohydrin rubber, polyacrylates, butyl rubber, or halobutyl rubber. The rubber material can be peroxide-cured or vulcanized. Preferred resins include LDPE, LLDPE, polypropylene, polystyrene, or ethylene copolymers such as ethylene-vinyl acetate copolymer (EVA), or ethylene-ethyl acrylate copolymer (EEA). Preferred EVA resins contain between 5 and 15 percent vinyl acetate.

When the polymer tape contains a polymer blend, the blend can contain up to 80 percent of the other polymer resins. Specifically, when the foam contains EVA, between 20 and 50 percent of the blend with the single-site initiated polyolefin resin can be EVA. Some EVA resins are commercially available from Exxon Chemical Company, Houston, Tex., Rexene Products Company, Dallas, Tex., and Quantum Chemical Company, Cincinnati, Ohio.

Silane-grafting of the polyolefin resin occurs when the polymer backbone is activated and reacts with a silane reagent to form the graft copolymer. The silane-graft can include a subsequently cross-linkable moiety in the graft chain. For example, the cross-linking can occur under warm, moist conditions when the cross-linkable moiety is hydrolyzable, optionally in the presence of a suitable catalyst. Levels of cross-linking can be adjusted by varying the amount of silane-grafting introduced to the polyolefin resin or the polyolefin resin blend. The silane-grafting occur in a separate process, or during a continuous blending and extruding process. Silane-grafting is generally accomplished by adding azido- or vinyl-functional silanes and a graft initiator to the polyolefin resin or blend. The grafting of the polyolefin resin or blend can take place, for example, in an extruder.

The graft initiator can be a free radical generating species, for example, a peroxide. Examples of peroxides include dicumylperoxide, 2,5-dimethyl-2,5-di(t-butylperoxy)hexane, 1,1-bis(t-butylperoxy)-3,3,5-trimethylcyclohexane, 1,1-di-(t-butylperoxy)cyclohexane, 2,2'-bis(t-butylperoxy)diisopropylbenzene, 4,4'-bis(t-butylperoxy)butylvalerate, t-butylperbenzoate, t-butylperterephthalate, and t-butyl peroxide. Most preferably, the graft initiator is dicumylperoxide or 2,2'-bis(t-butylperoxy)diisopropylbenzene.

Azido- and vinyl-functional silanes have the general formula RR'SiY$_2$, in which R represents an azido- or vinyl-functional radical attached to silicon through a silicon-carbon bond (e.g., composed of carbon, hydrogen, and optionally sulfur, nitrogen and oxygen), each Y represents a hydrolyzable organic radical (e.g., a radical that can be cleaved from silicon by the addition of water); and R' represents a monovalent hydrocarbon radical or a hydrolyzable organic radical.

Azido-functional silane compounds graft onto the polyolefin resin through a nitrene insertion reaction. Suitable azido-functional silanes include the trialkoxysilanes such as 2-(trimethoxysilyl)ethylphenylsulfonyl azide and 6-(triethoxysilyl)hexylsulfonyl azide.

Vinyl-functional silane compounds graft to the polymer resin by free-radical initiated reactions. Suitable vinyl-functional silanes include vinyl-functional alkoxy silanes such a vinyl trimethoxy silane (VTMOS) and vinyl triethoxy silane (VTEOS). Generally during grafting, graft initiators such as the peroxides are included with the vinyl-functional silane to perform a hydrogen abstraction from the polyolefin resin backbone to initiate grafting and polymerization of the vinyl-functional silane.

The graft can include other monomers, such as di- and tri-allyl cyanurates and isocyanurates, alkyl di- and tri-acrylates and methacrylates, zinc dimethacrylates and diacrylates, styrenes, and butadiene.

The grafted polymer resin can be cross-linked by exposure to moisture to effect silanol condensation reactions of the hydrolyzable groups of the pendant silane-grafts. Cross-linking develops through hydrolysis of the silane Y groups to form silanols which condense to form siloxanes. The condensation of silanols to siloxanes is catalyzed by metal carboxylates such as, for example, dibutyl tin dilaurate or dibutyl tin maleate. The metal carboxylates can be added to the polymer resin mixture before grafting, before blending, or before extrusion. The metal carboxylates are generally added in a liquid form or compounded in a polymer resin.

Most preferably, the silane is VTMOS, that is grafted on to the polymer backbone by a reaction which is initiated by 2,2'-bis(t-butylperoxy)diisopropylbenzene. The most preferred silanol condensation catalyst is dibutyl tin dilaurate. The cross-linking can be induced by the presence of atmospheric moisture, steam, or hot water. Cross-linking can take place predominantly (e.g., more than 50% of the potential cross-linking) prior to expansion (or extrusion) of the foam. Alternatively, the cross-linking can take place predominantly after expansion of the foam.

Regardless of the method of cross-linking used, acceptably flexible articles, particularly foamed articles, can only be obtained in certain ranges of cross-linking density or level, which is related to the amount of silane-grafting in the blend. Too much cross-linking can render the material inelastic. In a foam, this can result in less than optimal expansion and greater than optimal density for a given level of foaming agent. Too little cross-linking can be detrimental to physical properties such as compression set properties or thermal resistance, for example. It is important to choose cross-linking levels that afford materials with particular desired properties. The silane-grafting and resulting crosslinks increase the melt strength of the composition. The cross-linking levels can be determined by establishing the gel content of the of the composition, for example, by extraction with a solvent such as xylenes. Polymer tapes can have cross-link densities of over 55 percent, most preferably between 20 and 50 percent.

The polymer tapes can be foamed to make foamed tape. The foamed tapes are predominantly closed-cell foams and can be thermoformed. The expanding medium, or foaming agents, useful in the practice of the present invention, are physical foaming agents or chemical foaming agents. The term "physical foaming agent," as used herein, means a medium expanding composition that is a gas at temperatures and pressures encountered during the foaming step. Typically, a physical foaming agent is introduced to the polymer blend in the gaseous or liquid state and expands, for example, upon a rapid decrease in pressure. The term "chemical foaming agent," as used herein, means a medium expanding composition that is a solid or a liquid under ordinary processing conditions until the composition is decomposed to release gas. Chemical foaming agents can be decomposed, for example, at elevated temperatures.

Physical foaming agents include low molecular weight organic compounds including $C_1$–$C_6$ hydrocarbons such as acetylene, propane, propene, butane, butene, butadiene, isobutane, isobutylene, cyclobutane, cyclopropane, ethane, methane, ethene, pentane, pentene, cyclopentane, pentene, pentadiene, hexane, cyclohexane, hexene, and hexadiene, $C_1$–$C_5$ organohalogens, $C_1$–$C_6$ alcohols, $C_1$–$C_6$ ethers, $C_1$–$C_5$ esters, $C_1$–$C_5$ amines, ammonia, nitrogen, carbon dioxide, neon, or helium.

Chemical foaming agents include, for example, azodicarbonamide, p-p'-oxybis(benzene)sulfonyl hydrazide, p-toluenesulfonyl hydrazide, p-toluenesulfonyl semicarbazide, 5-phenyltetrazole, ethyl-5-phenyltetrazole, dinitrosopentamethylenetetramine, and other azo, N-nitroso, semicarbazide, sulfonyl hydrazides, carbonate, and bicarbonate compounds that decompose when heated. The preferred foaming agents are chemical foaming agents, such as azodicarbonamide.

The polymer tape generally is in the form of a sheet having a thickness between about 10 mils (¹⁄₁₀₀ inch) and ⁵⁄₁₆ inch. The sheet can be slit, die cut, or laminated. The polymer tape can be partially or extensively cross-linked prior to exiting the die, or can be extensively cross-linked after exiting the die. The foamed tape can be partially or extensively cross-linked prior to expansion, or can be extensively cross-linked after expansion.

The foamed tape can include foam activating agents, which decrease the decomposition temperature of the chemical foaming agent. Activating agents include metal salts such as zinc salts, for example, zinc stearate or zinc oxide.

Since the foamed tapes have increased melt strength, a smaller cell size and higher cell densities can be achieved in the foam. The higher cell densities lead to lower density foams. The foamed tapes have densities between about 1.5 and about 50 pounds per cubic foot.

Other additives, alone or in combination, can be added to the tape compositions including antioxidants (e.g., hindered phenolics such as Irganox 1010, phosphites such as Irgafos 168, or polymerized trimethyl-dihydroquinoline such as Agerite AK, Resin D or Flectol H), ultra-violet stabilizers, thermal stabilizers, antistatic components, flame retardants, pigments or colorants, and other processing aids. In particular, processing aids, such as fluorinated elastomers (Viton, available from DuPont or Dynamar, available from 3M), and anti-block agents, such as talc, silica or calcium carbonate, are added to the polymer tape compositions.

The polymer tape, or foamed tape, is coated on at least one face of the foam with an adhesive. In many cases, the polymer tape, or foamed tape, is a sheet that is coated on both sides with an adhesive for use in joining applications. It is desired that the polymer tape, or foamed tape, have good peel strength, tensile strength, shear strength, and cleavage strength when joining two articles. The tensile strength, elongation, compression resistance (compression deflection), compression set, and tear strength can be determined, for example, according to the procedure of ASTM D-3575. The flexibility of the polymer tape is an important component of these properties.

Adhesives include, but are not limited to, rubber and acrylic adhesives. In general, adhesives are tacky materials. In general, rubber adhesives are composed of natural or synthetic rubbers that are made tacky by the addition of other components to the mixture that do not change substantially over time. Acrylic adhesives, on the other hand, change chemically over time giving them different adhesion properties. Acrylic adhesives are based on acrylic or acrylate polymers. In general, acrylic adhesives are formulated to optimize particular properties of the tape.

Rubber adhesives can be generally characterized as having high initial adhesion, moderate strength with shear forces, moderate lifetimes, moderate temperature resistance, and fair resistance to ultraviolet light. Acrylic adhesives can be generally characterized as having fair initial adhesion that increases substantially over its lifetime, high strength, high temperature resistance, excellent temperature resistance, and excellent resistance to ultraviolet light.

Rubber adhesives can be based, for example, on one or more of the following elastomers including butadiene-acrylonitrile rubber, butadiene-polyacrylate rubber, butadiene-styrene rubber, butyl rubber, chlorinated rubber, chlorobutyl rubber, cyclized rubber, depolymerized rubber, natural rubber, polybutadiene, polychloroprene, polyisobutylene, polyisoprene, polysulfide polyurethane rubber, reclaimed rubber, silicone rubber, thermoplastic elastomers, and metallocene or single-site initiated polyolefins. Rubber adhesives are available, for example, from H.B. Fuller Company, Jedco Chemical Company, Lord Corporation, National Starch and Chemical Company, PPG Industries, Adhesives and Sealants Division, and 3M Company. These adhesives can use water or organic solvents or combinations thereof as a carrier.

Acrylic adhesives can be based, for example, on one or more of the following acrylic or acrylate polymers including acrylate-vinyl acetate copolymer, acrylic-ethylene copolymer, acrylonitrile-butadiene-styrene terpolymer, polyacrylate, carboxylic polyacrylate, polyacrylic esters, and polymethylmethacrylate. Acrylic adhesives are available, for example, from AMS, American Finish and Chemical Company, Clifton Adhesives, Incorporated, Continental Latex Corporation, Findlay Adhesives, Incorporated, H.B. Fuller Company, T.H. Glennon Company, Incorporated, Industrial Adhesives, Jedco Chemical Corporation, Key Polymer Corporation, National Starch and Chemical Company, and Swift Adhesives Division of Reichold Chemical.

Tapes can be produced by coating the substrate (in this case, the polymer tape, or foamed tape) with an adhesive using any of a number of conventional coating techniques including reverse roll coating, knife over roll coating, or extrusion coating. optionally, the coated substrate can be passed through an in-line dryer to remove solvent or water, or to chemically alter the coating. Machinery for coating these tapes can be purchased from equipment suppliers such as Ameriflex Group Incorporated, Black Clawson Converting Machinery Corporation, Inta-Roto, Incorporated, Klockner Er-We-Pa, and Wolverine Massachusetts Corporation.

Methods of combining the various ingredients of the composition include, for example, melt-blending, diffusion-limited imbibition, or liquid mixing. Any or all of the ingredients can be pulverized or reduced in particle-size by other methods prior to use. Melt-blending can be accomplished in a batchwise process or a continuous process. It is preferred that the blending be carried out with temperature control. Many suitable devices for melt-blending are known to the art, including, for example, mixers with single and multiple Archimedean-screw conveying barrels, high-shear "Banbury" type mixers, and other internal mixers. The object of such blending (or mixing) is to provide a uniform mixture. Components can be introduced to the mixture in a step-wise fashion at any step during the mixing operation. The mixture can include a foaming agent that expands, for example, upon exposure to the sudden release of pressure or increase in temperature.

One preferred method of providing a sheet object of this invention involves blending the silane-grafted single-site initiated polyolefin resin with EVA, for example, extruding the blend, cross-linking the blend by exposure to moisture, and coating the blend with the adhesive. Alternatively, the blend can be expanded to form a foam by heating a blend including a chemical foaming agent. Typically, once the foam has been expanded, it is coated with the adhesive. The silane-grafted single-site initiated polyolefin resin can be prepared in a separate process or an independent step.

For example, the single-site initiated polyolefin resin is melt-blended with a 20:1 mixture of vinyl trimethoxy silane (VTMOS) and dicumylperoxide in an extruder to effect the grafting of VTMOS onto the resin. This composition is extruded out of a multiple-strand die face and is then pelletized. The resulting silane-grafted single-site initiated polyolefin resin is melt-blended with ungrafted EVA resin and other additives, which can include the chemical foaming agent. The blending can occur in a single-screw extruder or a twin-screw extruder. The blend is extruded into, for example, a sheet. The sheet is exposed to moisture in a controlled temperature and humidity environment to cross-link the composition. When the composition includes a chemical foaming agent, the sheet can be expanded to a foam by passing the sheet through an infra-red oven at a temperature sufficient to decompose the chemical foaming agent. The sheet is then coated with an adhesive, before or after foaming.

Alternatively, the single-site initiated polyolefin resin and other polymer resins can be blended and silane-grafted in a single step. The blend can be combined with other components, such as a chemical foaming agent, in a separate step, or in a continuous process after the grafting step. Cross-linking can take place to a large extent before, during, or after expanding the foam.

The following specific examples are to be construed as merely illustrative, and not limitive, of the remainder of the disclosure.

EXAMPLE 1

The grafted resin was prepared by blending and reacting 49 parts Exxon Exact™ 4049, 50 parts Exxon LD 319 EVA (9% vinyl acetate) copolymer, 1 part of a fluoroelastomer processing aid (3 percent in a LLDPE concentrate), 0.35 parts vinyl trimethoxy silane, and 0.018 parts 2,2'-bis(t-butylperoxy)diisopropylbenzene (Vulcup R). The blend was extruded at a 400° F. melt temperature and pelletized.

The grafted resin was blended with other components, as listed in Table I. The blend was extruded into a cross-linkable sheet with a thickness of 0.028 inches and width of 23.5 inches. The melt temperature was held below 300° F. to prevent premature foaming during the extrusion process. The sheet was not foamed in this step.

TABLE I

| Formulation of the polymer sheet | |
|---|---|
| Grafted resin from Example 1 | 62.50% |
| 1.2% dibutyl tin dilaurate/1% antioxidant (97.8% LDPE concentrate) | 3.50% |
| 40% Azodicarbonamide (60% LDPE concentrate) | 15.5% |
| 23% Exxon LD319 EVA copolymer | 10.00% |
| 10% zinc oxide/20% zinc stearate (70% LDPE concentrate) | 6.00% |
| 50% titanium dioxide (50% LDPE concentrate) | 2.50% |

The sheet was exposed to a temperature of 150° F. and an atmosphere with a relative humidity of 90 percent for a period of 24 hours to cross-link the sheet. The cross-linked sheet was passed through an oven where it was exposed to temperatures of 450 to 500° F., causing foaming to occur. The resulting foam (Foam 1) had a density of 4 pounds per cubic foot, a thickness of $\frac{1}{16}$ inch, and a width of 60 inches. The properties of Foam 1 are outlined in Table III.

EXAMPLE 2

The grafted resin was prepared by blending and reacting 70 parts DuPont/Dow Engage™ 8200, 25 parts DuPont/Dow Engage™ 8445, 2 parts of a fluoroelastomer processing aid (3 percent in a LLDPE concentrate), 3 parts 10% silica antiblock (10 percent in a LDPE concentrate), 0.35 parts vinyl trimethoxy silane, and 0.018 parts 2,2'-bis(t-butylperoxy)diisopropylbenzene (Vulcup R). The blend was extruded at a 400° F. melt temperature and pelletized.

The grafted resin was blended with other components, as listed in Table II. The blend was extruded into a cross-linkable sheet with a thickness of 0.040 inches and a width of 9 inches. The melt temperature was held below 300° F. to prevent premature foaming in the extrusion process. This sheet was not foamed in this step.

TABLE II

| Formulation of the polymer sheet | |
|---|---|
| Grafted resin from Example 2 | 82.9% |
| 1.2% dibutyl tin dilaurate/1% antioxidant (97.8% LDPE concentrate) | 3.60% |
| 40% azodicarbonamide (60% LDPE concentrate) | 7.20% |
| 10% zinc oxide/20% zinc stearate (70% LDPE concentrate) | 3.80% |
| 50% titanium dioxide (50% LDPE concentrate) | 2.50% |

The sheet was exposed to a temperature of 150° F. and an atmosphere with a relative humidity of 90 percent for a period of 24 hours to cross-link the sheet. The cross-linked sheet was passed through an oven where it was exposed to temperatures of 450 to 500° F., causing foaming to occur. The resulting foam (Foam 2) had a density of 9 pounds per cubic foot, a thickness of $\frac{1}{16}$ inch, and a width of 20 inches. The properties of Foam 2 are outlined in the Table III.

In comparison testing, the properties of foamed polymer tapes (Foam 1 and Foam 2 from Example 1 and Example 2, respectively) containing silane-grafted single-site initiated polyolefin resins were compared to other foamed polymer tapes of comparable densities based on other polymers (EVA, PVC, and EDPM) according to ASTM D-3575. The results are listed in Table III. In Table III, tensile strength and elongation are reported in the machine direction and cross direction (Machine Direction/Cross Direction). The data on the Pandel, Lauren, and AMR foams were taken from Pandel bulletin UFI-1-0188, Lauren data sheet bc-0-610, and AMR catalogs, respectively. Data for the Volara foams were measured directly. The Pandel compression set is reported at 25%, while the others are reported at 50%. The foams containing silane-grafted single-site initiated polyolefin resins have good physical properties.

TABLE III

Comparison of foam properties

| | Polymer | Density (PCP) | Tensile Strength (PSI) | Elongation % | Compression Deflection (25%, PSI) | Compression Set (%) |
|---|---|---|---|---|---|---|
| Foam 1 | Silane-grafted | 4 | 136/107 | 582/552 | 6 | 4.2 |
| Valmra Type EO | EVA | 4 | 141/106 | 299/321 | 8 | 13.0 |
| Volara Type G | EVA | 4 | 140/123 | 328/398 | 6.7 | 16.2 |
| Foam 2 | Silane-grafted | 9 | 360/280 | 530/610 | 11 | 5.1 |
| Pandel UF-8 | PVC | 8 | 35+ | 100+ | 1.5–3.5 | 15 Max. |
| Pandel UF-12 | PVC | 12 | 65+ | 100+ | 2–6 | 15 Max. |
| Lauren BC-0-610 | EPDM | 18 | 185 | 205 | 5–9 | 11.5 |
| AMR 4119N | Neoprene | 7–13 | 60+ | 150+ | 2–5 | |

Other embodiments are within the claims.

What is claimed is:

1. A method of making a polymer tape comprising the steps of:
   providing a cross-linkable polymer mixture including at least one single-site initiated polyolefin resin and a chemical foaming agent;
   extruding the polymer mixture; and
   applying an adhesive to the polymer mixture.

2. The method of claim 1, further comprising the step of silane-grafting a portion of the polymer mixture.

3. The method of claim 1, further comprising the step of silane-grafting the single-site initiated polyolefin resin.

4. The method of claim 3, further comprising the step of expanding the polymer mixture to form a foam.

5. The method of claim 4, further comprising the step of cross-linking the polymer mixture.

6. The method of claim 5, wherein the step of cross-linking the polymer mixture includes exposing the polymer mixture to moisture.

7. A method of making a polymer tape comprising the steps of:
   providing a cross-linkable polymer mixture including at least one silane-grafted single-site initiated polyolefin resin and a chemical foaming agent;
   extruding the polymer mixture; and
   applying an adhesive to the polymer mixture.

8. The method of claim 7, further comprising the step of silane-grafting a portion of the polymer mixture.

9. The method of claim 7, further comprising the step of expanding the polymer mixture to form a foam.

10. The method of claim 7, further comprising the step of cross-linking the polymer mixture.

11. The method of claim 10, wherein the step of cross-linking the polymer mixture includes exposing the polymer mixture to moisture.

* * * * *

UNITED STATES PATENT AND TRADEMARK OFFICE
CERTIFICATE OF CORRECTION

| | |
|---|---|
| PATENT NO. | : 6,472,015 B1 |
| APPLICATION NO. | : 08/851375 |
| DATED | : October 29, 2002 |
| INVENTOR(S) | : Robert F. Hurley et al. |

It is certified that error appears in the above-identified patent and that said Letters Patent is hereby corrected as shown below:

<u>Column 4,</u>
Line 61, after "CL8001," delete "CLS8002," and insert therefor -- CL8002 --.

<u>Column 8,</u>
Line 43, after "coating" delete "optionally" and insert therefor -- Optionally --.

<u>Column 11,</u>
Table III, before "EVA" (first occurence) delete "Valmra" and insert therefor -- Volara --.
       after "Density" delete "(PCP)" and insert therefor -- (PCF) --.

Signed and Sealed this

Seventeenth Day of April, 2007

JON W. DUDAS
*Director of the United States Patent and Trademark Office*